United States Patent [19] | [11] 3,933,367
Tamas | [45] Jan. 20, 1976

[54] DUAL LEAF SPRING SUSPENSION

[75] Inventor: Attila J. Tamas, Lexington, Ky.

[73] Assignee: Dura Corporation, Southfield, Mich.

[22] Filed: July 3, 1974

[21] Appl. No.: 485,447

[52] U.S. Cl........ 280/104.5 A; 180/24.02; 267/54 A
[51] Int. Cl.²............................................ B60G 5/00
[58] Field of Search.............. 280/104.5 A, 104.5 B; 267/54 R, 54 A, 52; 180/24.01, 24.02, 24.03

[56] References Cited

UNITED STATES PATENTS

| | | | |
|---|---|---|---|
| 3,080,161 | 3/1963 | Felburn | 280/104.5 B |
| 3,089,690 | 5/1963 | Hintzen | 267/54 A |
| 3,580,347 | 5/1971 | McGee | 280/104.5 B |
| 3,751,063 | 8/1973 | Raidel | 280/104.5 A |
| 3,792,871 | 2/1974 | Chalmers | 280/104.5 A |
| 3,841,655 | 10/1974 | Schaeff | 267/54 R |

*Primary Examiner*—Philip Goodman
*Assistant Examiner*—John H. Carroll
*Attorney, Agent, or Firm*—Hill, Gross, Simpson, Van Santen, Steadman, Chiara & Simpson

[57] ABSTRACT

For a motor vehicle suspension of the type including dual leaf spring assemblies and a connecting rocker arm, a pair of elongated generally coextensive downwardly arched leaf springs in laminar coactive load-supporting relation include a front end attachment eye on the upper of the springs and a fail-safe terminal portion on the lower of the springs substantially enveloping the eye. The rear end portions of the springs have nested upwardly arched load supporting portions for engagement with the rocker arm. In non-loaded and normally loaded conditions of the associated vehicle the leaf springs provide constant rate spring action, and when excessive suspension random loads must be supported supplementary compression spring means carried by the leaf springs engage the vehicle frame with progressively increasing spring rate and avoid overstressing the leaf springs.

14 Claims, 5 Drawing Figures

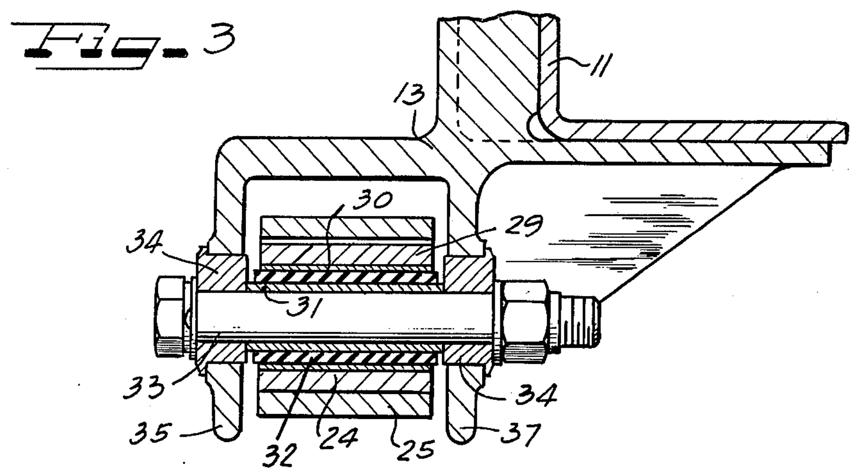
Fig. 3
11
13
30
29
34
31
33
34
35
32
24
25
37
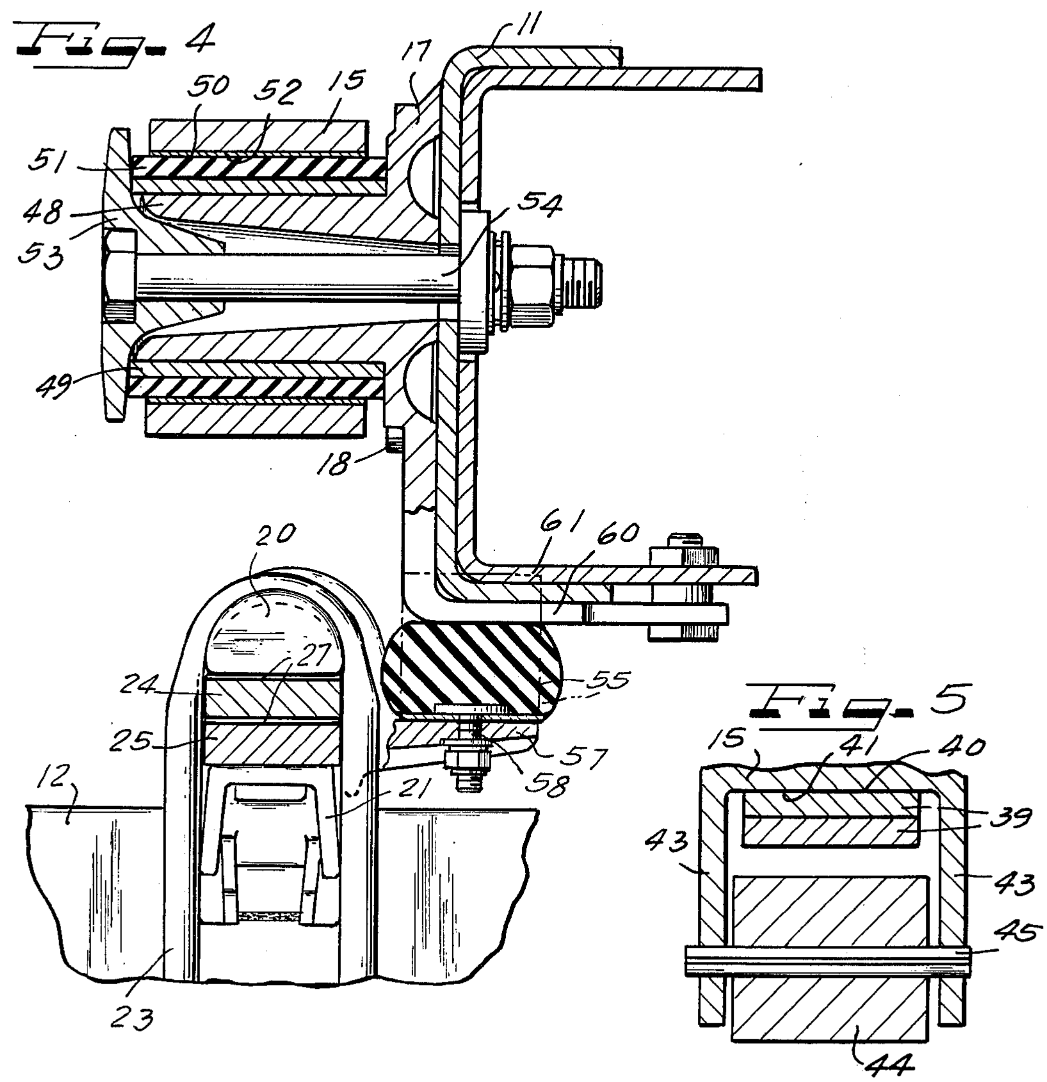
Fig. 4
11
17
50
52
15
51
48
54
53
49
18
61
60
20
27
24
55
25
57
58
12
21
23
Fig. 5
15
41
40
39
43
43
45
44

DUAL LEAF SPRING SUSPENSION

This invention relates generally to suspensions for automotive vehicle trucks and trailers, and is more particularly concerned with a dual leaf spring suspension in the sense that pairs of elongated leaf springs act together in load supporting relation and two such pairs of the springs are associated in load supporting relation with tandem axles of a vehicle.

Attention is invited to McGee U.S. Pat. No. 3,580,347 as representative of the principal prior art disclosure within the applicant's present knowledge. The disclosure herein relates to improvements in the type of leaf spring suspension disclosed in that patent, and more particularly in features which improve upon the functioning, durability, structural simplicity and greater efficiency in the spring assemblies.

According to the aforesaid patent, a tandem axle suspension includes two pairs of leaf springs and a rocker arm in the system. Each pair of springs is connected in load supporting relation upon one of the respective axles, has a forward end connection to a vehicle frame bracket and a rear end connection to the rocker arm which is intermediately pivotally mounted on the frame. Each of the spring leaves is tapered in thickness, the tapering of the top front and bottom rear of each pair of leaves differs from the bottom front and top rear leaf halves. In that arrangement, furthermore, until a preset vehicle load level is reached, the bottom front and top rear leaf halves of each pair carry only the unladen vehicle load, the top front and bottom rear leaf halves remaining unloaded. Under loaded vehicle condition, each leaf half takes a portion of the vertical load, the opposite end portions of the leaves being separated in the relatively unloaded condition of the vehicle. Such arrangement is intended to provide a variable rate multi-tapered leaf spring assembly in which there is a different spring rate for the loaded and unloaded conditions of the vehicle. However, while this produces ride improvement at unloaded or low load conditions, it penalizes the ride at high suspension loads.

According to the principles of the present invention several important improvements are provided, namely:

Constant rate tapered leaf spring assemblies are provided having large spring deflection under loaded and unloaded vehicle conditions ensuring suspension ride quality;

All of the leaf spring members are identically tapered;

Under both loaded and unloaded conditions of the vehicle, each leaf half takes the same portion of the suspension vertical load and windup torque and only the top front leaf half is connected to the vehicle bracket for resisting horizontal acceleration and braking forces;

The bottom front leaf half end envelopes the top front spring eye to provide a fail-safe to keep the axle connected to the frame should the spring eye fail;

Both of the rear portions of each spring pair is in load supporting relation to the walking beam;

Increased suspension reliability, load carrying capacity and durability are attained by the provision of auxiliary spring means which act to spare the leaf spring assemblies from excessive vehicle overload imposition either from actual cargo overload or rough travel conditions;

Improved attachment of the spring assemblies to the vehicle frame is provided;

There is an improved attachment of the walking beam to the vehicle frame.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 3 is an enlarged fragmentary vertical sectional detail view taken substantially along the line III—III of FIG. 1;

FIG. 4 is an enlarged fragmentary vertical sectional detail view taken substantially along the line IV—IV of FIG. 1; and FIG. 5 is a fragmentary enlarged sectional detail view taken substantially along the line V—V of FIG. 1.

Figures 1, 2:
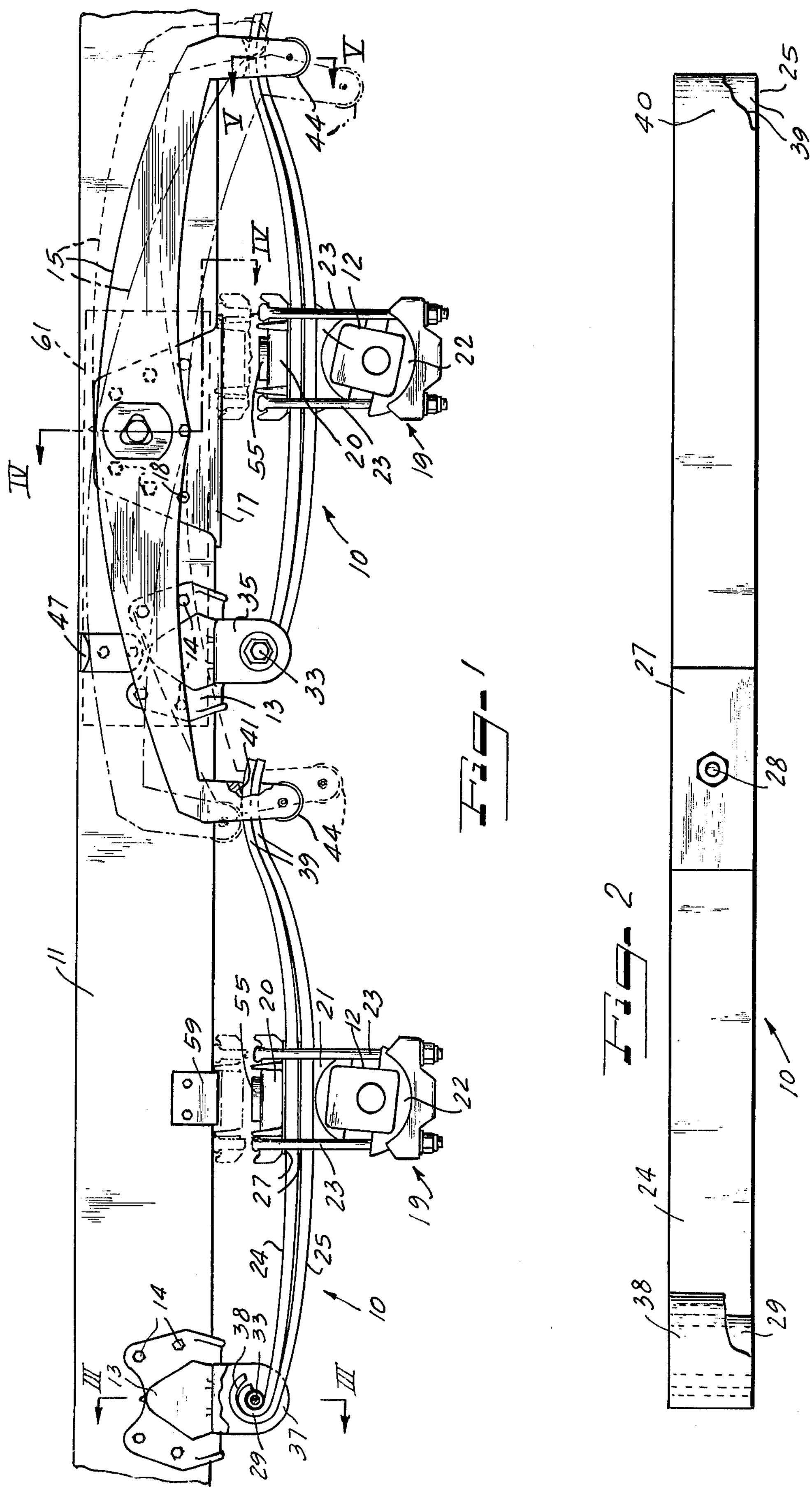
FIG. 1 is a side elevational view of a preferred embodiment of the invention.
FIG. 2 is a plan view of one of the leaf spring assemblies.

A dual leaf spring suspension embodying features of the present invention includes as principal components preferably identical pairs of constant rate elongated tapered thickness spring assemblies 10 (FIGS. 1 and 2) located in adjacently spaced generally longitudinal alignment for supporting a vehicle through a frame 11 on tandem wheel axles (not shown) including respective axle housings 12. At their front ends, the leaf spring assemblies 10 are connected to the frame 11 by means of respective brackets 13 secured to the frame as by means of screws 14. At their rear end portions, the spring assemblies 10 are connected to the frame 11 by means of a walking beam or rocker arm 15 which is centrally rockably attached to the frame 11 by means of a bracket 17 secured to the frame 11 as by means of screws 18. Attachment of the spring assemblies 10 to the axle housings 12 is by means of respective axle clamp assemblies 19 each of which comprises a spring cap 20 overlying the center of the spring assembly 10, a spring seat and axle pad 21 underlying the spring assembly and engaging the top portion of the axle housing 12, axle clamp means 22 engaging the bottom portion of the axle housing 12, and a pair of U-bolts 23 securing the clamp assembly together and into engagement with the spring assembly 10 and the axle housing 12, as shown (FIGS. 1 and 4).

Each of the leaf spring assemblies 10 comprises an upper metal spring member 24 and a lower metal spring member 25 which are generally coextensive, preferably identically tapered in thickness from a thicker central area toward each opposite end, of partial ellipse camber convexly downwardly, in internested relation, with shims or liners 27 between their central areas and on top of such area of the upper spring 24, and centrally connected together in assembly as by means of a bolt 28 (FIG. 2). At the front of each spring assembly 10, the upper spring member 24 is provided with means comprising an integral upwardly turned cylindrical eye 29 which carries a composite bushing including an outer metal sleeve 30 (FIG. 3) in press fit engagement within the eye 29 and of the same length. Between the sleeve 30 and an inner smaller diameter metal sleeve 31 is an elastomeric sleeve 32. The inner sleeve 31 is slightly longer than the length of the eye 29 (and the width of the spring members 24 and 25 at this point) and is engaged on a pin in the form of a hexagon head bolt 33 which also extends through respective eccentric compression, washers 34 carried by spaced outer and inner flanges 35 and 37, respectively, of the hanger bracket 13 and fixedly engaging the respective ends of the sleeve 31 as drawn up by the bolt 33. Eccentricity of the washers 34 enables suitable adjustment in order to provide precise positioning of the spring assembly for accurate location of the axle to which it is secured with respect to means driving the axle. A centered relationship of the forward end portions of the springs 24 and 25 between the flanges 35 and 37 is maintained by the sleeve 31 in engagement with the washers 34, so that there can be free limited rotational movement of the spring eye 29 about the axis of the bolt 33 and conical flexibility about the longitudinal axis of the spring leaves as permitted by the elastomeric sleeve 32.

At their front ends, the spring members 24 and 25 are in mutual laminar load supporting relation under the attaching bolt 33, so that under both loaded and unloaded conditions of the associated vehicle each of the leaf members 24 and 25 assumes equal portion of the suspension vertical load and windup torque through the hanger bracket 13. However, only the upper spring member 24 will absorb horizontal acceleration and braking forces by reason of engagement of the eye 29 about the bolt 33 assisted to a limited extent by a front end portion of the lower spring 25 curled into an elongated cylindrically shaped auxiliary eye 38 (FIG. 1) substantially enveloping the eye 29 in the manner of a so-called military wrapper. Thereby the auxiliary eye 38 provides a fail-safe or reserve safety device to maintain the axle connected to the frame through the bolt 33 and the hanger bracket 13 should the spring eye 29 fail for any reason.

At their rear end portions, the spring members 24 and 25 are provided with complementary reversely curved, upwardly convex, internested, mutually load supporting respective terminals 39 the upper of which provides an upwardly facing cam surface 40 engageable with the associated end portion of the rocker arm 15. Each end portion of the rocker arm 15 has, for this purpose, a downwardly facing cam surface 41 (FIGS. 1 and 5) which engages the spring cam surface 40 under load, with both of the terminal portions 39 of the springs 24 and 25 in mutual load supporting nested relation. Carried by each respective end portion of the rocker arm 15 spaced below the cam surface 41 and underlying the lower spring terminal 39 in normally limited spaced relation between flanges 43, is an elastomeric stop roller 34 mounted on a roll pin 35 limiting relative movement of the spring terminals away from the cam surfaces 41 in the running operation of the suspension wherein the rocker arm 15 may rock throughout a range exemplified by the dash line and dot dash line phantom representations in FIG. 1. To stop upward overrun swinging of at least the forward end portion of the rocker arm 15, a stop bracket 47 is desirably mounted on the frame 11 in overlying relation to the rocker arm.

In an improved rocker mounting of the arm 15, the frame mounted bracket 17 has a pintle projection 48 (FIG. 4) about which is engaged an inner metal sleeve 49 which has uniformly between it and an outer larger diameter metal sleeve 50 an elastomeric sleeve 51. The outer sleeve 50 is press fitted into a bore 52 in the central portion of the rocker arm 15 and is of no greater length than the width of the rocker arm. However the inner sleeve 49 is longer than and projects to opposite sides of the rocker arm 15 and projects at its outer end slightly beyond the end of the pintle 48. Thereby a compression cap 53 drawn up by a bolt 54 clamps the inner end of the sleeve 49 against the bracket 17. This arrangement provides for the limited rotational or torque and conical movements of the walking beam or rocker arm 15 desirable in the running operation of the suspension system.

As will be appreciated, the leaf spring assemblies 10 act as constant rate spring assemblies. By permitting relatively large spring deflection between loaded and unloaded vehicle conditions, the spring assemblies 10 ensure suspension ride quality. To increase the suspension reliability, load carrying capacity and durability of the suspension system, means are provided for changing the constant rate spring action of the spring assemblies 10 into progressively increasing rate spring system when excessive suspension random loads are encountered. For this purpose, each of the spring assemblies 10 is provided with resiliently compressible spring means desirably in the form of an elastomeric spring block 55 (FIGS. 1 and 4) which is normally inactive but functions to limit approach of the frame 11 and the associated axle housing 12 so that the load of the steel springs 24 and 25 can be kept below a detrimental value. In a desirable arrangement, the compression springs 55 are mounted on rearwardly projecting rigid respective shelves 57 formed as integral projections from the spring caps 20. Thereby the compression springs 55 are located to underlie the adjacent outer portion of the frame 11. Suitable means such as stud bolts 58 secure the springs 55 in place on the respective shelves 57. The mass and upward extent of the springs 55 is such that when the axle clamps 19 and the frame 11 approach close to one another as indicated in dash outline in FIG. 1, the springs 55 will engage respective surfaces rigid with the underside of the frame 11 and be compressed as indicated on comparison of the full line and dotted line positions of the spring in FIG. 4.

In order to provide thrust reinforcement for the frame 11, which may be in the form of a metal channel, a bumper stop bracket 59 is desirably secured to the frame 11 over the spring 55 of the forwardmost spring assembly 10. For the same purpose, the rocker arm bracket 17 is desirably provided with a rearward extension portions 60 underlying and engaging with the frame 11 to serve as a bumper stop for the spring 55 of the rearmost spring assembly 10. In addition, a reinforcing insert piece 61 is desirably mounted within the channel of the frame 11 and may extend not only along the area of the frame 11 to which the bracket 17 is secured, but also along the area of the frame 11 to which the stop 47 is secured, thereby substantially reinforcing the frame by helping to assume shock thrusts of the suspension elements thereagainst.

It will be understood that variations and modifications may be effected without deparing from the spirit and scope of the novel concepts of this invention.

I claim as my invention:

1. In combination with a motor vehicle frame and tandem axle housings, the frame having respective hanger brackets spaced forwardly from the axle housings, a rocker arm rockably mounted on the frame and having a downwardly facing camming surface on a forward end portion located forwardly in spaced relation adjacent to the rearmost of said hanger brackets and a rear end portion camming surface located substantially rearwardly from the rear of the tandem axle housings:

two pairs of elongated generally coextensive downwardly arched leaf spring assemblies;

one of said assemblies having its front end portion attached to the front hanger bracket and having a rear end portion cammingly engaging the front end camming surface of the rocker arm;

the other of said spring assemblies being located rearwardly in alignment with said one spring assembly and having its front end portion attached to the rearmost of said hanger brackets and its rear end portion provided with a camming surface engaging the camming surface on the rear end portion of the rocker arm;

means attaching the spring assemblies centrally thereof with respectively the front and rear axle housings;

a rocker arm bracket carried by said frame;

means rockably connecting the rocker arm intermediate its ends to said rocker arm bracket comprising a pintle projection on the rocker arm bracket, a combination bushing including a metal sleeve engaged about the pintle and a metal sleeve engaged with the rocker arm with an elastomeric sleeve maintaining spaced relation between the metal sleeves, and means securing a cap against an outer end of the inner sleeve to secure it to the rocker arm bracket, whereby to provide for rocking torque and conical movements of the rocker arm about the pintle; and a compression spring carried by the rear spring assembly and engageable with a bumper surface provided by said rocker arm bracket.

2. A combination according to claim 1, said one spring assembly including a compression spring, and said frame having a surface engageable by such compression spring.

3. In combination with a vehicle frame and an axle housing:

a leaf spring assembly comprising a pair of laminar leaf springs mutually coacting in load supporting relation throughout their length;

means connecting the spring assembly at one end in load supporting relation to the vehicle frame;

a rocker arm pivotally mounted on the frame and having a cam surface engagement with the opposite end of the spring assembly;

means connected the spring assembly intermediate its ends in load supporting relation to the axle housing;

said spring assembly providing a constant rate load supporting relation between the frame and the axle housing; and supplementary spring means carried by the central portion of the spring assembly normally spaced from the frame and thrusting against the frame with progressively increasing spring rate under excessive suspension random loads.

4. A combination according to claim 3, wherein said means attaching the spring assembly to the axle housing comprises a clamp structure, said clamp structure including a support for said supplementary spring means.

5. A combination according to claim 4, wherein said frame has a bumper surface for said supplementary spring means, and means reinforcing the frame in the area of said surface.

6. In a suspension for use in a motor vehicle including a frame, an axle housing, a hanger bracket attached to the frame forwardly spaced from the axle housing and having a spring attachment pin, and a downwardly facing camming surface carried by the frame spaced rearwardly from the axle housing, the improvement comprising:

a pair of elongated generally coextensive downwardly arched leaf springs in laminar coactive load-supporting relation;

central portions of the springs being attachable in load supporting relation to the axle housing;

the upper of said springs having a front end eye for pinned load supporting attachment to said bracket;

the lower of said springs having a front terminal portion substantially enveloping the upper spring eye as a failsafe connection with the bracket in the event of failure of said eye;

rear end portions of the springs being in mutually load supporting engagement, the upper spring rear portion having a cam surface for load supporting engagement with said camming surface carried by the frame;

a combination bushing carried by said eye including a metal sleeve engaged within the eye, an elastomeric sleeve engaged within said metal sleeve, a second metal sleeve engaged within said elastomeric sleeve and engageable about the bracket pin, the elastomeric sleeve maintaining spaced relation of the metal sleeves, said second sleeve being longer than and projecting beyond each opposite end of the eye to be fixedly engaged by and between members carried by the hanger bracket to permit free limited rotational movement of the spring eye about the axis of the pin and conical flexibility about the longitudinal axis of the leaf springs as permitted by the elastomeric sleeve;

said pair of springs being adapted to provide a constant rate load supporting relation between the frame and the axle housing; and supplementary spring means carried by said pair of springs for normally spaced relation to a downwardly facing surface on the frame, the supplementary spring means being adapted to thrust against such surface with progressively increasing spring rate under excessive suspension random loads.

7. In a suspension for use in a motor vehicle including a frame, an axle housing, a hanger bracket attached to the frame forwardly spaced from the axle housing, and a downwardly facing camming surface carried by the frame spaced rearwardly from the axle housing, the improvement comprising:

a pair of elongated generally coextensive downwardly arched leaf springs in laminar coactive load-supporting relation;

central portions of the springs being attachable in load supporting relation to the axle housing;

the upper of said springs having a front end eye for pinned load supporting attachment to said bracket;

the lower of said springs having a front terminal portion substantially enveloping the upper spring eye as a failsafe connection with the bracket in the event of failure of said eye;

rear end portions of the springs being in mutually load supporting engagement, the upper spring rear portion having a cam surface for load supporting engagement with said camming surface carried by the frame;

said springs being of equal thickness at said central portions and each tapering uniformly toward each of its opposite end portions; and an overload compression spring carried by said pair of leaf springs and to remain under normal vehicle load spaced below a surface fixed with respect to said frame but engageable with said fixed surface for changing the constant rate spring action of the leaf springs into progressively increasing rate spring system when excessive suspension random loads are encountered.

8. A suspension in combination with a motor vehicle having a frame, an axle housing, a hanger bracket attached to the frame forwardly spaced from the axle housing, and a downwardly facing camming surface carried by the frame spaced rearwardly from the axle housing:

a pair of elongated generally coextensive downwardly arched leaf springs in laminar coactive load-supporting relation;

means attaching central portions of the springs in load supporting relation to the axle housing;

the upper of said springs having a front end attachment eye;

pin means securing said eye to said bracket in load supporting relation;

the lower of said springs having a front terminal portion substantially enveloping the upper spring eye as a failsafe connection with said attaching means and said bracket in the event of failure of said eye;

rear end portions of the springs being in mutually load supporting engagement;

the upper spring rear portion having a cam surface in load supporting engagement with said camming surface carried by the frame;

a combination bushing between said pin means and said eye comprising a pair of differential metal sleeves and an elastomeric sleeve engaged between said metal sleeves and permitting limited torque and conical movements of the eye relative to the pin in the running operation of the suspension;

a supplemental upwardly directed compression spring bumper;

a mount for said compression spring bumper carried by said means for attaching the central portions of the leaf springs to the axle housing and positioned under the frame; and a downwardly facing bumper surface on the frame against which said compression spring bumper is engageable.

9. A suspension in combination with a motor vehicle having a frame, an axle housing, a hanger bracket attached to the frame forwardly spaced from the axle housing, and a downwardly facing camming surface carried by the frame spaced rearwardly from the axle housing:

a pair of elongated generally coextensive downwardly arched leaf springs in laminar coactive substantially constant rate spring action load-supporting relation;

means attaching central portions of the springs in load supporting relation to the axle housing;

the upper of said springs having a front end attachment eye;

pin means securing said eye to said bracket in load supporting relation;

the lower of said springs having a front terminal portion substantially enveloping the upper spring eye as a failsafe connection with said attaching means and said bracket in the event of failure of said eye;

rear end portions of the springs being in mutually load supporting engagement;

the upper spring rear portion having a cam surface in load supporting engagement with said camming surface carried by the frame; and an overload compression spring carried by said pair of leaf springs and under normal load spaced below a surface fixed with respect to said frame but engageable with said fixed surface for changing the constant rate spring action of the leaf springs into progressively increasing rate spring system when excessive suspension random loads are encountered.

10. A combination according to claim 9, wherein said overload spring comprises an elastomeric spring, and means associated with said means for attaching central portions of the springs to the axle housing mounting said compression spring under said frame.

11. A combination according to claim 10, including reinforcing means carried by the frame and providing said surface.

12. A combination according to claim 11, said reinforcing means including a bracket rockably mounting said rocker arm.

13. A combination according to claim 11, said reinforcing means comprising a bracket carried by said frame.

14. A suspension in combination with a motor vehicle having a frame, an axle housing, a hanger bracket attached to the frame forwardly spaced from the axle housing, and a downwardly facing camming surface carried by the frame spaced rearwardly from the axle housing:

a pair of elongated generally coextensive downwardly arched leaf springs in laminar coactive load-supporting relation;

means attaching central portions of the springs in load supporting relation to the axle housing;

the upper of said springs having a front end attachment eye;

pin means securing said eye to said bracket in load supporting relation;

the lower of said springs having a front terminal portion substantially enveloping the upper spring eye as a failsafe connection with said attaching means and said bracket in the event of failure of said eye;

rear end portions of the springs being in mutually load supporting engagement;

the upper spring rear portion having a cam surface in load supporting engagement with said camming surface carried by the frame;

a supplemental upwardly directed compression spring bumper;

a mount for said compression spring bumper carried by said means for attaching the central portions of the leaf springs to the axle housing and positioned under the frame; and a downwardly facing bumper surface on the frame against which said compression spring bumper is engageable.

* * * * *